(12) United States Patent
Miller

(10) Patent No.: US 10,240,680 B2
(45) Date of Patent: Mar. 26, 2019

(54) VALVE SEALING DEVICE FOR A TILTING-ARMATURE VALVE AND METHOD FOR PRODUCING A VALVE SEALING DEVICE FOR A TILTING-ARMATURE VALVE

(71) Applicant: KNORR-BREMSE SYSTEME FUER NUTZFAHRZEUGE GMBH, Munich (DE)

(72) Inventor: Bernhard Miller, Weil der Stadt (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 100 days.

(21) Appl. No.: 15/520,357

(22) PCT Filed: Oct. 9, 2015

(86) PCT No.: PCT/EP2015/073462
§ 371 (c)(1),
(2) Date: Apr. 19, 2017

(87) PCT Pub. No.: WO2016/062564
PCT Pub. Date: Apr. 28, 2016

(65) Prior Publication Data
US 2017/0321816 A1    Nov. 9, 2017

(30) Foreign Application Priority Data

Oct. 20, 2014   (DE) .................. 10 2014 115 207

(51) Int. Cl.
*F16K 1/36*   (2006.01)
*F16K 1/44*   (2006.01)
(Continued)

(52) U.S. Cl.
CPC .............. *F16K 13/02* (2013.01); *F16K 5/184* (2013.01); *F16K 13/10* (2013.01); *F16K 31/0682* (2013.01); *F16K 3/085* (2013.01)

(58) Field of Classification Search
CPC . F16K 1/36; F16K 1/443; F16K 13/02; F16K 3/085; F16K 31/0627; F16K 31/0682
(Continued)

(56) References Cited

U.S. PATENT DOCUMENTS 1,166,027 A * 12/1915 Weisgerber et al. ........................
G05D 16/0683
137/505.11
2,203,684 A   6/1940 Hare
(Continued)

FOREIGN PATENT DOCUMENTS

EP   0488262 A1   6/1992
EP   1306594 A1   5/2003
(Continued)

OTHER PUBLICATIONS

International Search Report dated Jan. 5, 2016, of the corresponding International Application PCT/EP2015/073462 filed Oct. 9, 2015.

*Primary Examiner* — Seth W. Mackay-Smith
(74) *Attorney, Agent, or Firm* — Gerard Messina

(57) ABSTRACT

A valve sealing device for a tilting-armature valve, including: a sealing body having a first surface configured to close in a fluid-tight fashion a valve seat and/or an opening in a valve; and a retaining body which is arranged on a surface of the sealing body which is opposite the first surface, and is configured to secure the valve sealing device in and/or on a cutout in a valve, in particular in a cutout in a tilting armature of a tilting-armature valve, in particular in which the sealing body and/or the retaining body is essentially cylindrical in shape. A related method to make the valve
(Continued)

sealing device and a tilting-armature valve that includes the valve sealing device are also described.

16 Claims, 6 Drawing Sheets

(51) Int. Cl.
    *F16K 13/02*     (2006.01)
    *F16K 3/08*     (2006.01)
    *F16K 31/06*     (2006.01)
    *F16K 5/18*     (2006.01)
    *F16K 13/10*     (2006.01)

(58) Field of Classification Search
    USPC ........................... 251/129.15, 129.16
    See application file for complete search history.

(56) References Cited

U.S. PATENT DOCUMENTS

| | | | | |
|---|---|---|---|---|
| 3,683,962 | A * | 8/1972 | Good | F16K 11/168 |
| | | | | 137/868 |
| 3,722,531 | A * | 3/1973 | Verhart | F15B 13/0405 |
| | | | | 137/271 |
| 4,250,924 | A * | 2/1981 | Sakakibara | F16K 31/0624 |
| | | | | 137/596.17 |
| 4,527,590 | A * | 7/1985 | Kolze | F16K 31/10 |
| | | | | 137/596.17 |
| 4,545,563 | A * | 10/1985 | Morioka | F16K 31/0624 |
| | | | | 137/625.2 |
| 4,889,314 | A * | 12/1989 | Hashizume | F16K 31/0682 |
| | | | | 251/129.02 |
| 5,318,071 | A * | 6/1994 | Gaiardo | F16K 31/0682 |
| | | | | 137/625.44 |
| 5,553,567 | A * | 9/1996 | Wilson | A01J 5/10 |
| | | | | 119/14.28 |
| 5,603,482 | A * | 2/1997 | Mott | F16K 31/0682 |
| | | | | 251/129.15 |
| 7,021,603 | B2 * | 4/2006 | Wygnaski | F16K 31/0682 |
| | | | | 251/129.15 |
| 2003/0183289 | A1 * | 10/2003 | Seuret | F15B 13/0405 |
| | | | | 137/625.65 |
| 2003/0226601 | A1 * | 12/2003 | Frisch | F16K 31/0682 |
| | | | | 137/625.65 |
| 2004/0021107 | A1 * | 2/2004 | Kimura | B41J 2/17509 |
| | | | | 251/65 |
| 2005/0253104 | A1 * | 11/2005 | Sato | F16K 31/0627 |
| | | | | 251/129.19 |
| 2007/0239042 | A1 * | 10/2007 | Takahashi | F16K 31/0682 |
| | | | | 600/498 |
| 2008/0149192 | A1 * | 6/2008 | Holec | F16K 31/0682 |
| | | | | 137/491 |
| 2010/0176323 | A1 * | 7/2010 | Nguyen | F16K 11/24 |
| | | | | 251/129.15 |
| 2015/0260303 | A1 * | 9/2015 | Cebon | F16K 31/082 |
| | | | | 251/65 |

FOREIGN PATENT DOCUMENTS

EP     1860314 A2     11/2007
FR     2550602 A1     2/1985

* cited by examiner

VALVE SEALING DEVICE FOR A TILTING-ARMATURE VALVE AND METHOD FOR PRODUCING A VALVE SEALING DEVICE FOR A TILTING-ARMATURE VALVE

FIELD OF THE INVENTION

The present invention relates to a valve sealing device for a tilting-armature valve, to a method for producing a valve sealing device for a tilting-armature valve and to a use of a valve sealing device in a tilting-armature valve for a pressure regulating module of a vehicle.

BACKGROUND INFORMATION

Valves have seals in order to close off a valve outlet or a valve inlet in a fluid-tight fashion.

SUMMARY OF THE INVENTION

Against this background, an improved valve sealing device for a tilting-armature valve, a method for producing a valve sealing device for a tilting-armature valve and a use of a valve sealing device a tilting-armature valve for a pressure regulating module of a vehicle as described herein is disclosed. Advantageous refinements can be found in the respective further descriptions herein and the following description.

A sealing device for a valve, in particular a tilting-armature valve, can be arranged on a movable element of the valve such as, for example, a tilting armature. The sealing device is positioned fixedly and the sealing device is coupled to the movable element by a retaining body of the valve sealing device. The functionality of the sealing is performed by a sealing body or a surface of the sealing body when the sealing body is moved against a valve seat or pressed against said valve seat.

A valve sealing device for a tilting-armature valve comprises:

a sealing body, a first surface of which is designed to close in a fluid-tight fashion a valve seat and/or an opening in a valve; and a retaining body which is arranged on the surface of the sealing body which is opposite the first surface, and is designed to secure the valve sealing device in and/or on a cutout in a valve, in particular in a cutout in a tilting armature of a tilting-armature valve, in particular wherein the sealing body and/or the retaining body are/is essentially cylindrical in shape.

A valve sealing device can be understood to be a sealing element and/or a damper element for a valve. A sealing body can be a plastic-elastic solid body. The first surface of the sealing body can be formed in a planar fashion. The sealing body can merge with the retaining body on the surface or side which is opposite the first surface. An external contour of the sealing body can differ from an external contour of the retaining body here.

The sealing body can be at least partially surrounded by a metal sleeve, in particular a metal pot. Additionally or alternatively, the retaining body can be at least partially surrounded by a metal sleeve, in particular a metal pot. The metal sleeve can be a deep-drawn pot. The valve sealing device can be surrounded by a sheet-metal deep-drawn part or a sheet-metal covering, wherein only the end-side supporting face or sealing face, that is to say the first surface, is free of the sheet-metal covering. Therefore, more efficient and therefore more cost-effective fabrication can be achieved by multiple vulcanization. At the same time, the valve sealing device, in particular the sealing body, can have a stable side wall, as a result of which better dimensional stability of the sealing body which acts as a sealing element and damper element can be achieved in the case of frequent valve activation.

The valve sealing device can have a further sealing body which is arranged on a side of the retaining body which is opposite the sealing body. In particular, the further sealing body can be surrounded at least partially by a further metal sleeve. A shape or an external contour of the sealing body and a shape or an external contour of the further sealing body can correspond to one another. The further metal sleeve can have the same shape as the metal sleeve.

The sealing body and the further sealing body can each have an essentially round base shape. The sealing body and the further sealing body can be arranged offset with respect to one another. In this context, the sealing body and the further sealing body can be connected via the retaining body located between them.

It is also favorable if the sealing body and the further sealing body are each at least partially surrounded by a metal sleeve, in particular a metal pot. In this context, at least one armature which is connected to the metal sleeve which surrounds the sealing body and at least one armature which is connected to the further metal sleeve which surrounds the further sealing body can be enclosed by the retaining body. The armature which is connected to the metal sleeve and the armature which is connected to the further metal sleeve can each have two limbs which are aligned transversely with one another. In this way, the armature can be formed in an L shape. In this context, a relatively long limb of the armature can be connected to the metal sleeve. If the metal sleeve is formed as a metal pot, the armature can be connected to a floor of the metal pot. In this context, the floor can have a hole wherein on one side of the hole the armature is connected to the floor of the metal pot. A multiplicity of armatures can be embodied on a metal sleeve. In this context, the retaining body can have an elongate shape.

The elastomer of the sealing body and/or of the further sealing body is advantageously surrounded by a sheet-metal outer wall in such a way that the supporting face or sealing face which has been referred to as the first surface or further first surface is free of sheet-metal covering, while at least the side walls are encapsulated by sheet metal, in order to ensure that the sealing body and/or the further sealing body have good dimensional stability of the sealing body and/or of the further sealing body despite frequent valve activation. The sealing body and the further sealing body can also be referred to as a sealing element and a damper element to their function in a tilting-armature valve.

A method for manufacturing a valve sealing device for a tilting-armature valve has at least one forming step of a sealing body and a retaining body. In this context, a first surface of the sealing body is designed to close in a fluid-tight fashion a valve seat and/or an opening in a valve. In this context, the retaining body is arranged on the surface of the sealing body which is opposite the first surface. The retaining body is designed to secure the valve sealing device in and additionally or alternatively on a cutout in a valve, in particular in a cutout in a tilting armature of a tilting-armature valve, in particular wherein the sealing body and/or the retaining body are/is essentially cylindrical in shape.

In the forming step, the sealing body and additionally or alternatively the retaining body can be vulcanized. In this context, the valve sealing device can be formed or vulcanized in one piece.

The method can additionally comprise at least one of the following steps:

making available a first sheet-metal panel and second sheet-metal panel;

deep drawing a first metal sleeve, in particular a first metal pot, and at least a second metal sleeve, in particular a second metal pot, in the first sheet-metal panel and a first metal sleeve, in particular a first metal pot, and at least a second metal sleeve, in particular at least a second metal pot, in the second sheet-metal panel;

punching a first ring, interrupted by at least one retaining bridge, around the first metal sleeve and a second ring, interrupted by at least one retaining bridge, and the at least second metal sleeve, in each of the two sheet-metal panels;

aligning the first sheet-metal panel with the second sheet-metal panel, wherein the metal sleeves which are deep-drawn in the deep drawing step point toward one another; and/or singularizing the first valve sealing device and/or the at least second valve sealing device by breaking the retaining bridges.

In the forming step a first sealing body can be formed within the first metal sleeve of the first sheet-metal panel and a further first sealing body can be formed within the first metal sleeve of the second sheet-metal panel, and a first retaining body can be formed between the first metal sleeve of the first sheet-metal panel and the first metal sleeve of the second sheet-metal panel, wherein the first retaining body connects the first sealing body to the further first sealing body. In this context, the first sealing body, the first retaining body and the further first sealing body can form a first valve sealing device. In the forming step an at least second sealing body can be formed within the at least second metal sleeve of the first sheet-metal panel and an at least further second sealing body can be formed within the at least second metal sleeve of the second sheet-metal panel, and an at least second retaining body can be formed between the at least second metal sleeve of the first sheet-metal panel and the at least further second metal sleeve of the second sheet-metal panel, wherein the at least second retaining body connects the at least second sealing body to the at least further second sealing body. In this context, the at least second sealing body, the at least second retaining body and the at least further second sealing body can form at least a second valve sealing device.

One variant of a valve sealing device described here is used in a tilting-armature valve for a pressure regulating module on a vehicle, wherein the tilting-armature valve comprises at least one coil element, an armature, a spring and a half-shell, wherein the coil element comprises at least one coil former and a coil which is arranged radially around the coil former, wherein the armature is mounted on an end side of the armature by a bearing, wherein the armature can be moved from a first position into a second position by activating the coil, wherein the spring is designed to move the armature, wherein a first partial region of the spring is arranged on a side of the armature facing the coil element and applies a force to the armature in order to move the armature in the direction of the first position, and a second partial region of the spring is arranged on a side of the armature facing away from the coil element, wherein the valve sealing device is arranged on the side of the armature facing away from the coil element, and wherein a valve seat with an outlet and an inlet for a fluid are formed in the half-shell, wherein in the first position of the armature the outlet can be closed off in a fluid-tight fashion by the valve sealing device.

Exemplary embodiments of the present invention are explained in more detail below with reference to the appended drawings.

DETAILED DESCRIPTION

In the following description of the exemplary embodiments of the present invention, identical or similar reference numbers are used for the elements which are illustrated in the various drawings and act similarly, with a repeated description of these elements being omitted.

Figure 1:
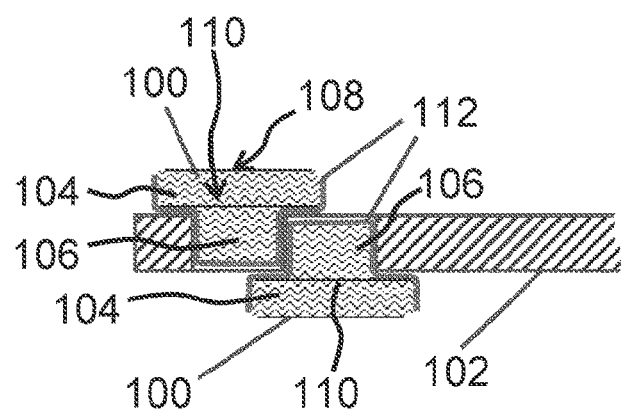
FIG. 1 shows a schematic cross-sectional illustration of two valve sealing devices in a tilting armature according to an exemplary embodiment of the present invention.

FIG. 1 shows a schematic illustration of two valve sealing devices 100 in a tilting armature 102 according to an exemplary embodiment of the present invention. A valve sealing device 100 is respectively arranged at two opposite sides in the tilting armature 102. The valve sealing devices 100 have in each case a sealing body 104 and a retaining body 106. A first surface 108 of the valve sealing device 100 is designed to close in a fluid-tight fashion a valve seat and/or an opening in a valve. The retaining body 106 is arranged on the surface 110 of the sealing body 104 which is opposite the first surface 108. The retaining body 106 is designed to secure the valve sealing device 100 in or on a cutout of the tilting armature 102. For this purpose, the tilting armature 102 has two cutouts, in each of which a retaining body 106 of the two valve sealing devices 100 is arranged.

Both the sealing body 104 and the retaining body 106 are surrounded by a metal sleeve 112. In the exemplary embodiment shown in FIG. 1, the metal sleeve 112 is embodied as a deep-drawn metal pot 112. For example, the metal pots 112 are filled with vulcanized rubber in the exemplary embodiment illustrated in FIG. 1.

Figure 13:
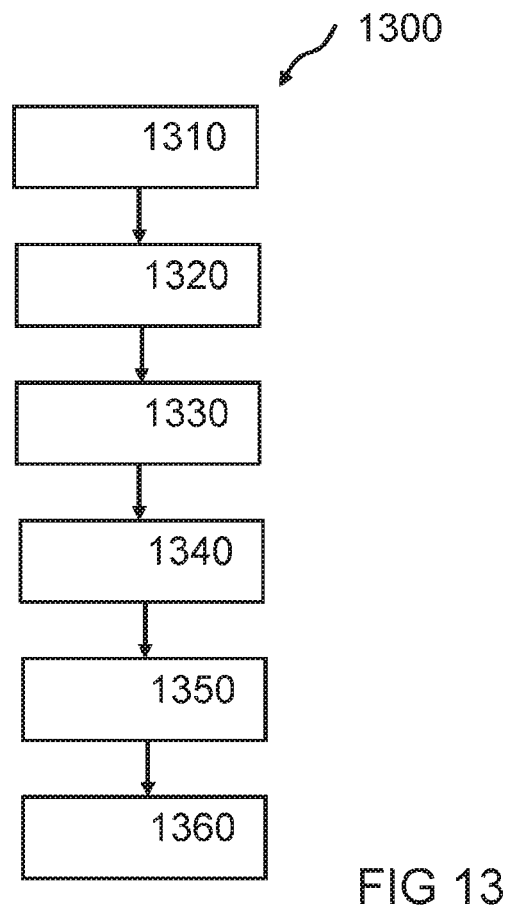
FIG. 13 shows a flowchart of a method for manufacturing a valve sealing device for a tilting-armature valve according to an exemplary embodiment of the present invention.
Figure 14:
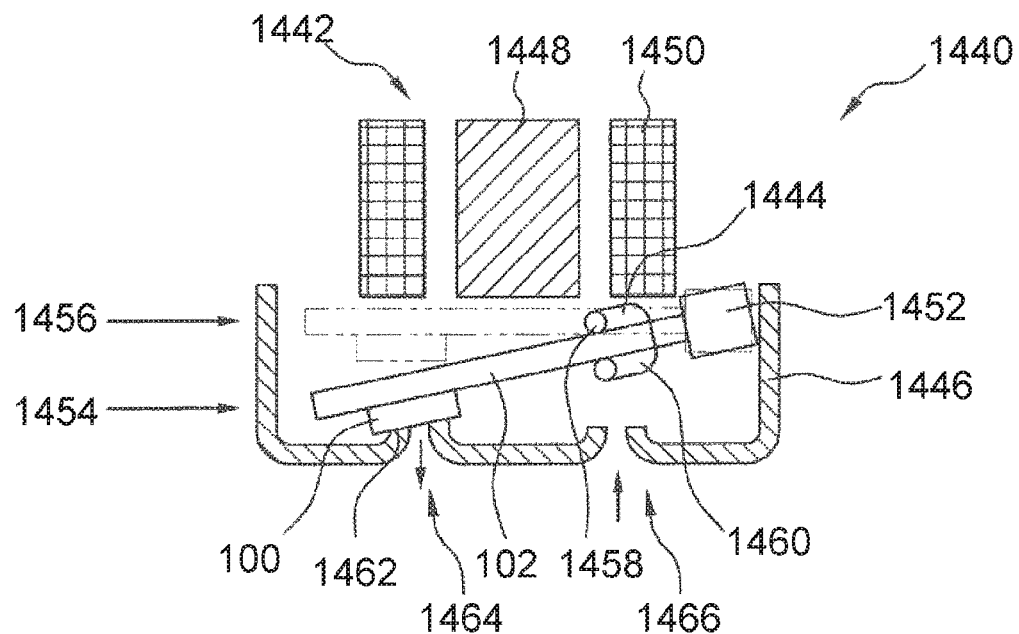
FIG. 14 shows a schematic illustration of a tilting-armature valve for use with an exemplary embodiment of the present invention.

The tilting armature 102 is designed to be used in a tilting-armature valve as illustrated in FIG. 14. The two metal pots 112 which are filled with vulcanized rubber are pressed individually into the armature plate 102. In this context, two identical metal pots 112 can be used for a valve seat and for a damper in the tilting-armature valve. The method described in FIG. 13 for producing the valve sealing devices 100 shows how a large number of metal pots 112 on a common sheet-metal panel are simultaneously vulcanized in a cost-effective fashion, in comparison with or instead of vulcanizing individual and comparatively large armature sheet-metal elements 102. Corresponding sheet-metal panels are described in FIG. 4 and FIG. 12.

Figure 2:
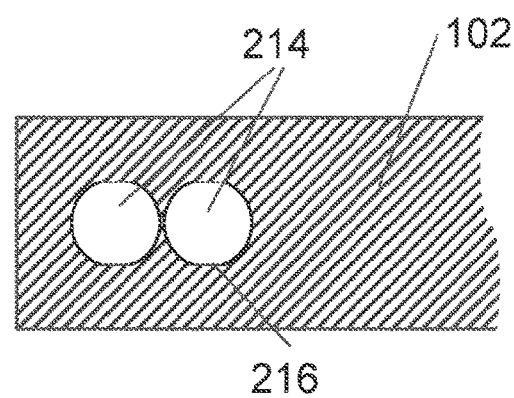
FIG. 2 shows a simplified illustration of a portion of a tilting armature for use with or in an exemplary embodiment of the present invention.

In the exemplary embodiment illustrated in FIG. 1, both the sealing body 104 and the retaining body 106 are essentially cylindrical in shape. FIG. 2 shows the specified cutout in the tilting armature 102, which cutout has at least one pitch line which is designed to prevent rotation of the valve sealing device. In this context, the valve sealing device 100 is pressed into the cutout.

FIG. 2 shows a simplified illustration of a detail of a tilting armature 102 according to an exemplary embodiment of the present invention. The tilting armature 102 is designed to be used as a movable valve element in a tilting-armature valve. The tilting armature 102 can be an exemplary embodiment of a tilting armature 102 shown in FIG. 1. The tilting armature 102 shown in FIG. 2 has an essentially rectangular shape, wherein the illustration is cut away on the right-hand side. Two cutouts 214 which are arranged directly one next to the other along the longitudinal extent of the tilting armature 102 with a thin web between the two cutouts 214 are formed in the tilting armature 102. The cutouts 214 each have two partial regions with a partially straight line 216 parallel to the longitudinal extent of the tilting armature 102. The two partially straight lines 216 of a cutout 214 are therefore arranged on two opposite sides of the cutout 214. The partially straight lines 216 are designed to prevent rotation of a valve sealing device which is pressed into the cutout. The valve sealing devices which can be pressed into the cutout 214 can be exemplary embodiments of the valve sealing device 100 which is shown in FIG. 1.

In one exemplary embodiment, the cutout 214 is, as shown in FIG. 2, embodied as a breakthrough or hole, and in another exemplary embodiment the cutout 214 is embodied, as shown in FIG. 1, as a drilled hole or depression into which the valve sealing device can be inserted.

Figure 3:
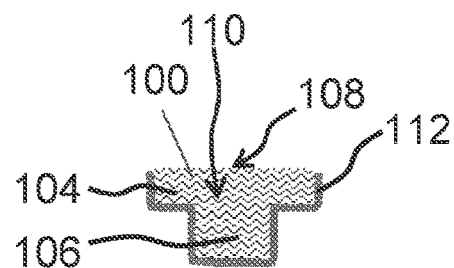
FIG. 3 shows a schematic cross-sectional illustration of a valve sealing device according to an exemplary embodiment of the present invention.

FIG. 3 shows a schematic illustration of a valve sealing device 100 according to an exemplary embodiment of the present invention. The valve sealing device 100 can be a variant of an exemplary embodiment (shown in FIG. 1) of a valve sealing device 100. The valve sealing device 100 comprises a sealing body 104 and a retaining body 106. The layer which forms the sealing body 104 and the layer which forms the retaining body 106 are arranged bearing one directly on the other. The valve sealing device 100 also comprises a metal sleeve 112 which completely encapsulates the valve sealing device as far as the first surface 108. In this context, the metal sleeve 112 can, as illustrated in the following fig clock FIG. 4, be composed of a piece of sheet metal, in that the metal sleeve 112 is produced as a deep-drawn element. The metal sleeve 112 is filled with a permanently elastic material which, when subjected to mechanical stress, returns to its original position and has a high tearing strength.

Figure 4:
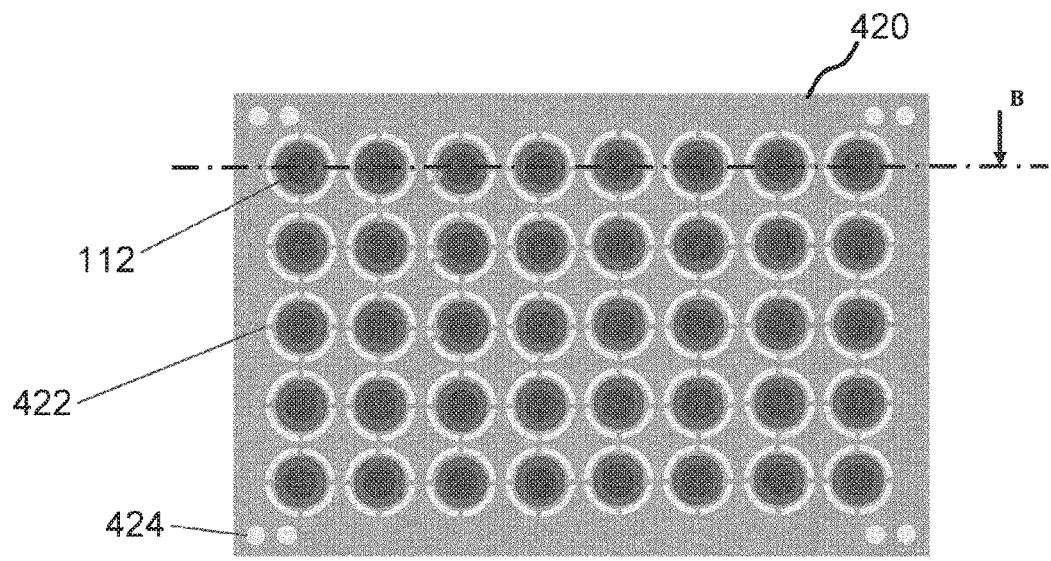
FIG. 4 shows a schematic illustration in a plan view of a sheet-metal panel for manufacturing a multiplicity of valve sealing devices according to an exemplary embodiment of the present invention.

FIG. 4 shows a schematic illustration in a plan view of a sheet-metal panel 420 for producing a multiplicity of valve sealing devices according to an exemplary embodiment of the present invention. The valve sealing devices can be exemplary embodiments of the valve sealing devices 100 which are shown in FIG. 1 or FIG. 3. The sheet-metal panel 420 has a rectangular shape. In each case eight metal pots 112 for corresponding valve sealing devices are arranged in five rows in the sheet-metal panel 420. The metal pots 112 are deep-drawn metal pots 112 which have a step in their side wall, that is to say a further section which is deep-drawn even further in a first floor of the metal pot 112. The metal pots 112 are each secured in the sheet-metal panel 420 by four retaining bridges 422. In this context, the retaining bridges 422 are formed in such a way that the metal pots 112 can be easily separated. The metal pots 112 are correspondingly also referred to as deep-drawn pots 112 in accordance with their method of production.

In order to ensure clarity, both in the case of the retaining bridges 422 and in the case of the centering holes 424 described below just one retaining bridge 422 or centering hole 424 is respectively provided with a reference number.

The sheet-metal panel 420 has, at the four corners, in each case two centering holes 424 for precisely inserting the sheet-metal panel 420 into an injection molding mold. The two centering holes are arranged one next to the other, in each case in the main directional extent of the sheet-metal panel 420.

FIG. 4 also shows a sectional axis B which runs centrally through the first row of metal pots 112. A corresponding sectional view is illustrated as a side view in FIG. 5.

Figure 5:
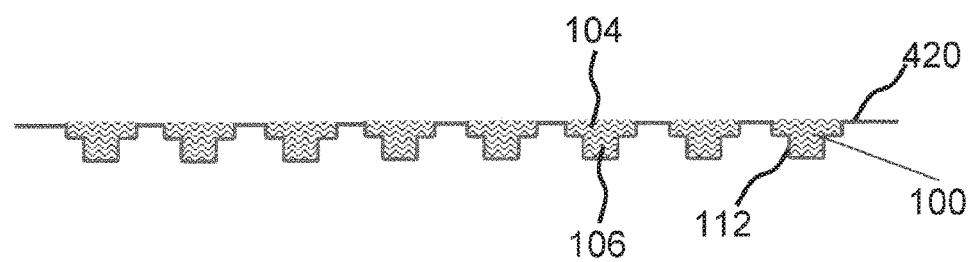
FIG. 5 shows a schematic sectional illustration of a sheet-metal panel for manufacturing a multiplicity of valve sealing devices according to an exemplary embodiment of the present invention.

FIG. 5 shows a schematic sectional illustration of a sheet-metal panel 420 for producing a multiplicity of valve sealing devices 100 according to an exemplary embodiment of the present invention. The valve sealing devices 100 can be exemplary embodiments of valve sealing devices 100 shown in FIG. 1 or FIG. 3. The sheet-metal panel 420 can be an exemplary embodiment of a sheet-metal panel 420 shown in FIG. 4, wherein the illustration in FIG. 5 shows a sectional illustration along the sectional axis B of the sheet-metal panel 420 shown in FIG. 4. Eight valve sealing devices 100 are illustrated in the sectional view. In the sectional illustration, the sheet-metal panel 420 has, in a row, eight metal pots 112 which can be separated and in each of which a sealing body 104 and a retaining body 106 is vulcanized. The valve sealing devices 100 are therefore vulcanized completed components before separation.

Figure 6:
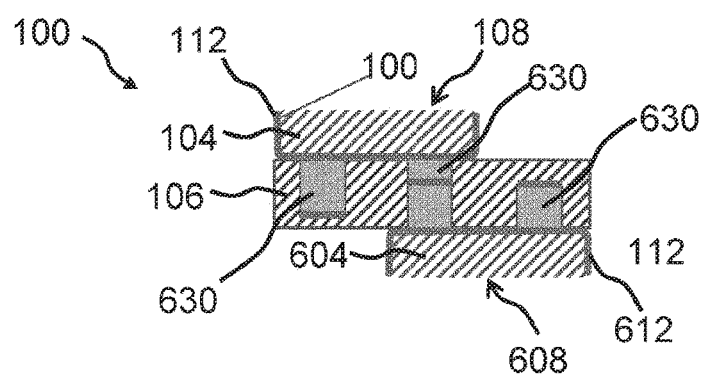
FIG. 6 shows a schematic sectional view of a valve sealing device according to an exemplary embodiment of the present invention.

FIG. 6 shows a schematic sectional view of a valve sealing device 100 according to a further exemplary embodiment of the present invention. The valve sealing device 100 can be an exemplary embodiment of a valve sealing device 100 shown in FIG. 1, FIG. 3 or FIG. 5. The valve sealing device 100 shown in FIG. 6 has a further sealing body 604 which is arranged on a side of the retaining body 106 which is opposite the sealing body 104. Both the sealing body 104 and the further sealing body 604 are at least partially surrounded by a metal sleeve 112, 612. Both the metal sleeve 112 and the further metal sleeve 612 are embodied as metal pots 112 or further metal pots 612 which, with the exception of the first surface 108 and a further first surface 608, encapsulate the sealing body 104 or the further sealing body 604, respectively. The sealing body 104 and the further sealing body 604 are connected to one another via the retaining body 106. In this context, the first surface 108 of the sealing body 104 and the further first surface 608 of the further sealing body 604 point in two opposite directions. As is apparent from the following figure, FIG. 7, the sealing body 104 and the further sealing body 604 each have an essentially round base shape.

In a floor of the metal pot 112 which encapsulates the sealing body 104 two so-called armatures 630 are punched free. One end of the two armatures 630 is respectively connected to the metal pot 112. In this context, the armature 630 has a L shape, as is apparent, in particular, in FIG. 7. One limb of the L shape is therefore connected to a floor of the metal pot 112. This also applies analogously to the further metal pot 612.

The sealing body 104 and the further sealing body 604 are arranged offset with respect to one another. In this context, the sealing body 104 and the further sealing body 604 are oriented with respect to one another in such a way that in each case an armature 630 engages in itself, or two corresponding armatures 630 engage one in the other. The armatures 630 are enclosed by the retaining body 106.

The exemplary embodiment of a valve sealing device 100 which is illustrated in FIG. 6 is illustrated in the following figures FIG. 7 to FIG. 10 in various views and installation positions in a tilting armature.

Figure 7:
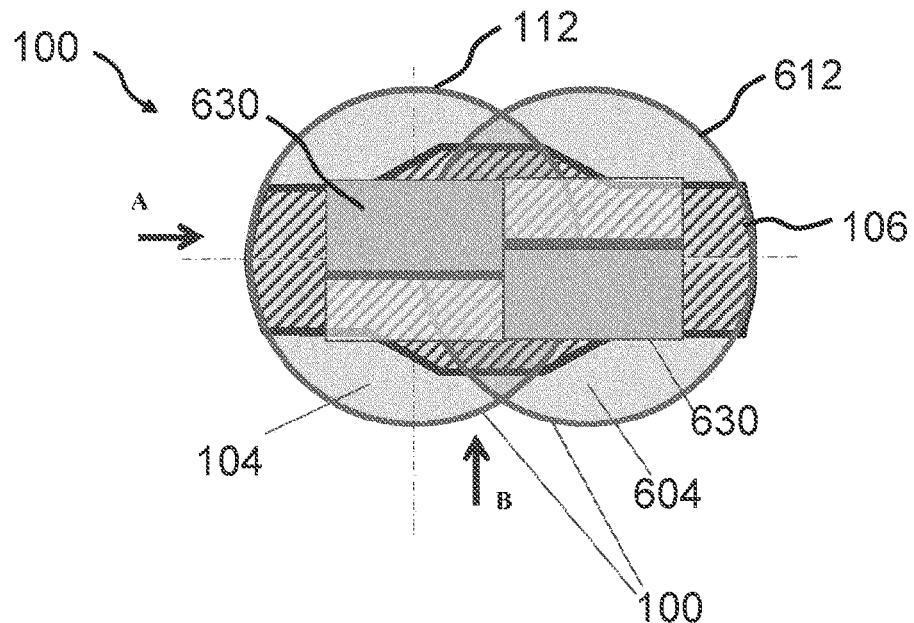
FIG. 7 shows a schematic illustration in a plan view of a valve sealing device according to an exemplary embodiment of the present invention.

FIG. 7 shows a schematic illustration in a plan view of a valve sealing device 100 according to an exemplary embodiment of the present invention. The valve sealing device 100 can be an exemplary embodiment of a valve sealing device 100 which is shown in FIG. 6. The sealing body 104 and the further sealing body 604 are arranged offset with respect to one another, wherein one partial region of the sealing body 104 overlaps with one partial region of the further sealing body 604. The sealing body 104 and the further sealing body 604 are connected to one another via the retaining body 106. The sealing body 104 is at least partially encapsulated by a metal sleeve 112. The metal sleeve 112 is connected to an armature 630, wherein the armature 630 projects into the retaining body 106. The further sealing body 604 is at least partially encapsulated by a further metal sleeve 612. The further metal sleeve 612 is connected to an armature 630, wherein the armature 630 projects into the retaining body 106.

The retaining body 106 has a base shape in the form of a parallelepiped, the two sides of which are each fitted to the rounding of the sealing body 104 or of the further sealing body 604. The two side faces of the retaining body 106 which can be seen in the plan view have, in a central region, a projection which is designed to secure the valve sealing device 100 in a correspondingly formed tilting armature.

Figure 9:
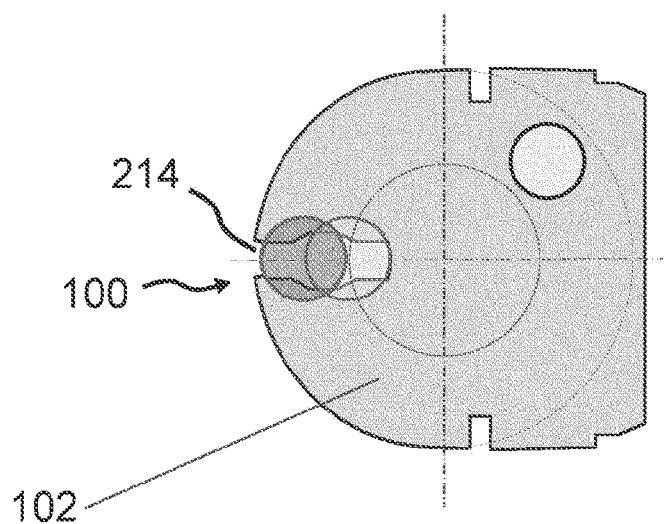
FIG. 9 shows a schematic illustration of a tilting armature with a valve sealing device arranged thereon, according to an exemplary embodiment of the present invention.

In the exemplary embodiment illustrated in FIG. 7, the retaining body 106 can also be referred to as a bridge 106 between the sealing body 104 and the further sealing body 604. Both the sealing body 104, the further sealing body 604 and the retaining body 104 can be fabricated essentially from a permanently elastic material such as, for example, rubber or a rubber-like mixture or mixture of plastics. The sealing body 104 can be used, for example, as a damper rubber in a tilting-armature valve. The further sealing body 604 can be used, for example, as a valve rubber in a tilting-armature valve. A corresponding tilting armature is illustrated in FIG. 9. A corresponding tilting-armature valve is illustrated in FIG. 14.

Figure 10:
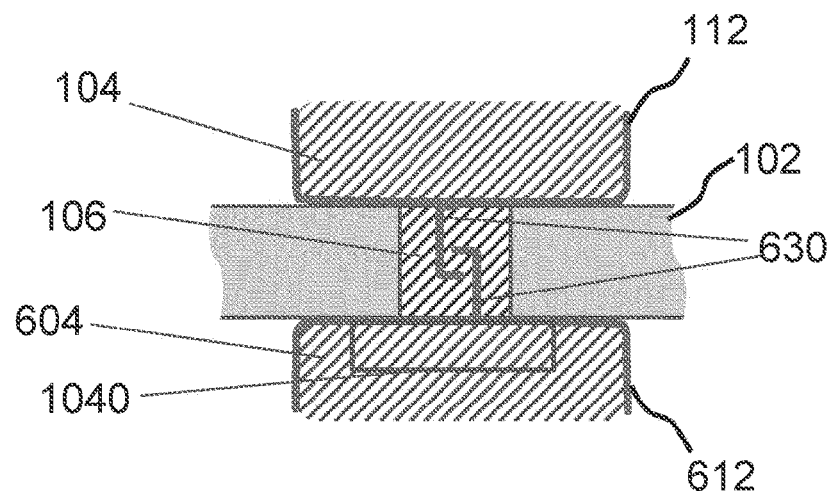
FIG. 10 shows a schematic sectional view of a tilting armature with a valve sealing device arranged thereon, according to an exemplary embodiment of the present invention.

In FIG. 7 two arrows are illustrated which represent a view A and a view B. One view from the direction denoted by A is illustrated in FIG. 10, and one view from the direction denoted by B is illustrated in FIG. 8.

Figure 8:
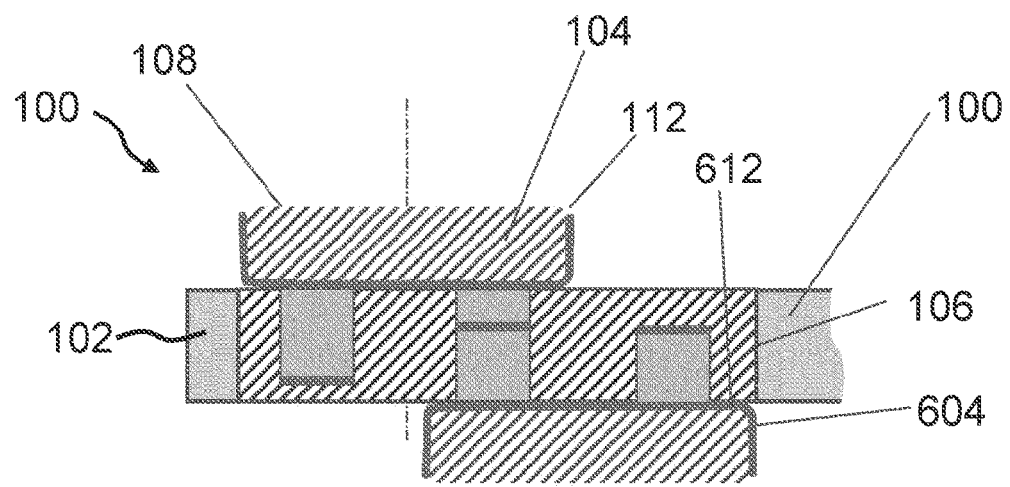
FIG. 8 shows a schematic sectional view of a valve sealing device arranged in a tilting armature according to an exemplary embodiment of the present invention.

FIG. 8 shows a schematic sectional view of a valve sealing device 100 arranged in a tilting armature 102 according to an exemplary embodiment of the present invention. The illustration of the valve sealing device 100 corresponds to the illustration in FIG. 6, with the difference that the valve sealing device 100 is arranged in a tilting armature 102. The sealing body 104 is arranged on one side of the tilting armature 102, and the further sealing body 604 is arranged on a side of the tilting armature 102 which is opposite the arrangement of the sealing body 104. A thickness of the tilting armature 102 corresponds to a distance between the sealing body 104 and the further sealing body 604 which is filled by the retaining body 106. The metal sleeves 112, 612 of the two sealing bodies 104, 604 are arranged essentially on the surface of the tilting armature 102.

The illustration in FIG. 8 corresponds to the valve sealing device 100 illustrated in FIG. 7 in a side view from the direction indicated by the arrow B.

FIG. 9 shows a schematic illustration of a tilting armature 102 with a valve sealing device 100 which is arranged thereon, according to an exemplary embodiment of the present invention. The valve sealing device 100 can be the exemplary embodiment shown in FIG. 8, as in the case of the tilting armature 102. The tilting armature 102 has an essentially round base shape, wherein the tilting armature has, in the region of the bearing, a straight line which is oriented according to a tangent to the base shape. In the illustrated exemplary embodiment the tilting-armature 102 is fabricated as a punched and stamped piece of sheet metal. The tilting armature 102 has, mirror-symmetrically, two notches through which a mirror-symmetrical spring for changing sides can be guided. In the region of the bearing, a bearing half-shell can be formed in the tilting armature, in which bearing half-shell a needle roller can be guided whose length corresponds largely to a diameter or an extent of the armature. A cutout 214, into which the valve sealing device 100 can be plugged, or in which the valve sealing device 100 is arranged, is arranged in the tilting armature 102, on the side opposite the bearing region.

The two side faces, which are opposite one another, of the cutout 214 have, in a central region, a projection which is designed to secure the valve sealing device 100.

FIG. 10 shows a schematic sectional view of a tilting armature with a valve sealing device arranged thereon, according to an exemplary embodiment of the present invention. The valve sealing device 100 in the exemplary embodiment illustrated in FIG. 10 is a valve sealing device 100 as illustrated in FIG. 7 to FIG. 9, wherein the valve sealing device 100 is shown in a side view corresponding to the direction indicated by the arrow A in FIG. 7. The valve sealing device 100 is arranged in a tilting armature 102. The sealing body 104 is arranged on a side of the tilting armature 102, and the further sealing body 604 is arranged on a side of the tilting armature 102 which is opposite the arrangement of the sealing body 104. A thickness of the tilting armature 102 corresponds to a distance between the sealing body 104 and the further sealing body 604 which is filled by the retaining body 106. The metal sleeves 112, 612 of the two sealing bodies 104, 604 are arranged essentially on the surface of the tilting armature 102. A L-shaped armature 630 is formed in a floor of the two metal sleeves 112, 612, said armature 630 pointing perpendicularly from the floor in the direction of the corresponding sealing body 604, 104 and the two transversely protruding limbs of the two L-shaped armatures 630 engaging one in the other. In this context, the armatures 630 are embedded in the retaining body 106.

Figure 11:
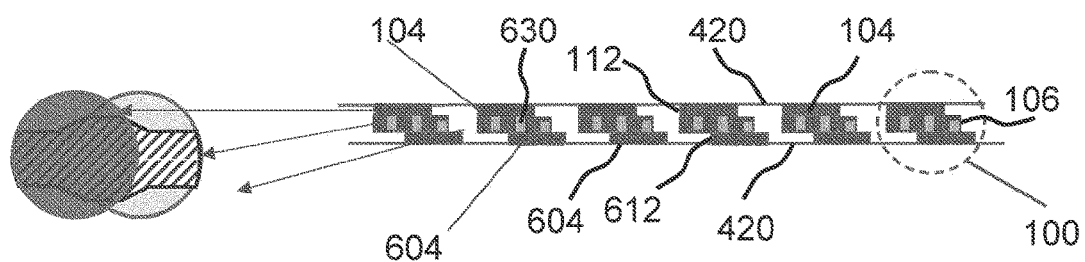
FIG. 11 shows a schematic sectional illustration of a sheet-metal panel for producing a multiplicity of valve sealing devices according to an exemplary embodiment of the present invention.

FIG. 11 shows a schematic sectional illustration of a sheet-metal panel 420 for producing a multiplicity of valve sealing devices 100 according to an exemplary embodiment of the present invention. The valve sealing devices can be an exemplary embodiment of a valve sealing device 100 shown in FIG. 6 to FIG. 10. In a sheet-metal panel 420, deep-drawn metal pots 112 are formed, as in a second sheet-metal panel 420 of the same type, in which deep-drawn further metal pots 612 are formed and which is arranged positioned upside down under the first sheet-metal panel 420. Rubber is vulcanized as damper rubber or valve rubber for a tilting-armature valve into the metal pots 112, 612. Formulated in more general terms, this means that the valve sealing device 100 comprises two sealing bodies 104, 604 which are connected via a retaining body 106. In this context, the sealing bodies 104, 604 are surrounded by a metal pot 112, 612. Armatures 630 connect the metal pots to the retaining body 106, with the result that a compact and ultimately single-piece component is produced.

In the illustration of FIG. 11, a side view with six valve sealing devices 100 is illustrated in a sectional illustration on the right. A plan view of a valve sealing device 100 is illustrated on the left. In this context, the plan view corresponds largely to the illustration in FIG. 7, with the illustration in FIG. 11 being somewhat further simplified.

The valve sealing device 100 is also referred to as a vulcanized sealing pill unit. As is apparent in FIG. 9, the valve sealing devices 100 are designed to be laterally lowered into a tilting armature.

Figure 12:
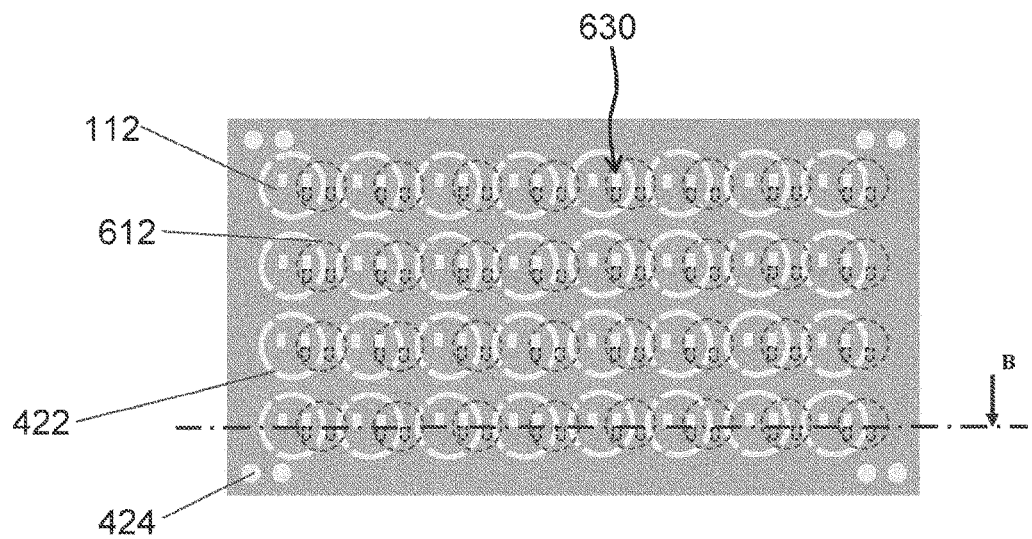
FIG. 12 shows a schematic illustration in a plan view of a sheet-metal panel for producing a multiplicity of valve sealing devices according to an exemplary embodiment of the present invention.

FIG. 12 shows a schematic illustration in a plan view of a sheet-metal panel 420 for producing a multiplicity of valve sealing devices according to an exemplary embodiment of the present invention. The valve sealing devices can be exemplary embodiments of the valve sealing devices 100 shown in FIG. 6 to FIG. 11. The sheet-metal panel 420 is rectangular in shape. In each case eight metal pots 112 for corresponding valve sealing devices are arranged in four rows in the sheet-metal panel 420. The metal pots 112 are deep-drawn metal pots 112. In each case two armatures 630 are punched from or formed in the metal pots 112. The metal pots 112 are each secured in the sheet-metal panel 420 by four retaining bridges 422. In this context, the retaining bridges 422 are formed in such a way that the metal pots 112 can be separated easily. The metal pots 112 are also referred to as deep-drawn pots 112 in accordance with their method of production.

At the four corners, the sheet-metal panel 420 has in each case two centering holes 424 for precisely inserting the sheet-metal panel 420 into an injection molding mold. The two centering holes are each arranged one next to the other in the main direction of extent of the sheet-metal panel 420.

In order to preserve clarity, both in the case of the metal pots 112, 612, the armatures 630, the retaining bridges 422 and in the case of the centering holes 424, in each case only one metal pot 112, 612, one armature 630, one retaining bridge 422 or one centering hole 424 has been respectively provided with a reference number.

The position of further metal pots 612 which are formed in a further sheet-metal panel 420 is illustrated by dashes, wherein the further sheet-metal panel 420 is placed upside down under the first sheet-metal panel. The two sheet-metal panels 420 are formed in the same way.

FIG. 12 also shows a sectional axis B which runs centrally through the first row of the metal pots 112. A corresponding sectional image is illustrated as a sectional view in FIG. 5.

FIG. 13 shows a flowchart of a method 1300 for the production of a valve sealing device for a tilting-armature valve according to an exemplary embodiment of the present invention. The valve sealing device can be a valve sealing device 100 as described in the preceding figures. The method 1300 has at least one forming step 1350, wherein in the forming step 1350 a sealing body is formed, a first surface of which is designed to close in a fluid-tight fashion a valve seat and/or an opening in a valve. Furthermore, in step 1350 a retaining body is formed which is arranged on the surface of the sealing body which is opposite the first surface, and said retaining body is designed to secure the valve sealing device in and/or on a cutout in a valve, in particular in a cutout in a tilting armature of a tilting-armature valve, in particular wherein the sealing body and/or the retaining body are/is essentially cylindrical in shape.

In the forming step 1350, the sealing body and/or the retaining body are optionally vulcanized.

In optional exemplary embodiments, the method 1300 has further optional steps. In this context, all of the steps which are optionally specified here are not absolutely necessary but rather the method 1300 can be extended, for example, with one of the following steps.

In an optional making available step 1310, at least one sheet-metal panel is made available. In the making available step 1310, at least a first sheet-metal panel and at least a second sheet-metal panel are optionally made available.

In an optional deep-drawing step 1320, a first metal sleeve, in particular a first metal pot, and at least a second metal sleeve, in particular a second metal pot, is deep-drawn in the first sheet-metal panel, and a first metal sleeve, in particular a first metal pot, and at least a second metal sleeve, in particular at least a second metal pot, is deep-drawn in the second sheet-metal panel.

In an optional punching step 1330, a first ring which is interrupted by at least one retaining bridge is punched around the first metal sleeve, and a second ring which is interrupted by at least one retaining bridge is punched around the at least second metal sleeve, in each of the two sheet-metal panels.

In an optional step 1340 of orienting the first sheet-metal panel can be oriented with respect to the second sheet-metal panel, wherein the metal sleeves which are deep-drawn in the deep-drawing step point toward one another.

In an optional variant of the forming step 1350, a first sealing body is formed within the first metal sleeve of the first sheet-metal panel, and a further first sealing body is formed within the first metal sleeve of the second sheet-metal panel, and a first retaining body is formed between the first metal sleeve of the first sheet-metal panel and the first metal sleeve of the second sheet-metal panel, wherein the first retaining body connects the first sealing body to the further first sealing body, wherein the first sealing body, the first retaining body and the further first sealing body form a first valve sealing device, and wherein in the forming step an at least second sealing body is formed within the at least second metal sleeve of the first sheet-metal panel, and an at least further second sealing body is formed within the at least second metal sleeve of the second sheet-metal panel, and an at least second retaining body is formed between the at least second metal sleeve of the first sheet-metal panel and the at least further second metal sleeve of the second sheet-metal panel, wherein the at least second retaining body connects the at least second sealing body to the at least further second sealing body, wherein the at least second sealing body, the at least second retaining body and the at least further second sealing body form at least a second valve sealing device.

In an optional separating step 1360, the first valve sealing device and the at least second valve sealing device are separated by breaking the retaining bridges.

A valve sealing device can be understood to be a valve rubber module for a pneumatic valve. A valve sealing device is also referred to as a valve seat module for a tilting-armature valve.

FIG. 14 shows a schematic illustration of a tilting-armature valve 1440 according to an exemplary embodiment of the present invention. The tilting-armature valve 1440 has a coil element 1442, an armature 102, a spring 1444, a valve sealing device 100 and a half-shell 1446. In this context, the coil element 1442 comprises at least one coil former 1448 and a coil 1450 which is arranged radially around the coil former 1448. An end side of the armature 102 is supported by a bearing 1452. The armature 102 can be moved between a first position 1454 and a second position 1456. In this context, the armature 102 is designed to be moved from the first position 1454 into the second position 1456 when the coil 1450 is activated. When the coil 1450 is activated, the armature 102 can be retained in the second position 1456. In this context, the spring 102 is designed to apply a force to the armature 102 in the direction of the first position 1454. In this way, the armature 102 can be retained in the first position 1454 when the coil 1450 is deactivated. A first partial region 1458 of the spring 1444 is arranged on a side of the armature 102 facing the coil element 1442. A second partial region 1460 of the spring 1444 is arranged on a side of the armature 102 facing away from the coil element 1442. Furthermore, the valve sealing device 100 is arranged on the side of the armature 102 facing away from the coil element 1442.

A valve seat 1462, with an outlet 1464, and an inlet 1466 for fluid are constructed in the half-shell 1446. In this context, the outlet 1464 can be closed in a fluid-tight fashion by the valve sealing device 100 when the armature 102 is arranged in the first position 1454.

The described exemplary embodiments are selected only by way of example and can be combined with one another.

THE LIST OF REFERENCE NUMBERS IS AS FOLLOWS:
100 Valve sealing device
102 Tilting armature, armature plate
104 Sealing body
106 Retaining body
108 First surface
110 Opposite surface
112 Metal sleeve, metal pot
214 Cutout
216 Partial line
420 Sheet-metal panel
422 Retaining bridge
424 Centering hole
604 Further sealing body
608 Further first surface
612 Further metal sleeve, further metal pot
630 Armature
1440 Tilting-armature valve
1442 Coil element
1444 Spring
1446 Half-shell
1448 Coil former
1450 Coil
1452 Bearing
1454 First position
1456 Second position
1458 First partial region
1460 Second partial region
1462 Valve seat
1464 Outlet
1466 Inlet

The invention claimed is:

1. A valve sealing device for a tilting-armature valve, comprising:
a sealing body having a first surface to close in a fluid-tight manner one of a valve seat and an opening in a valve; and
a retaining body arranged on a surface of the sealing body which is opposite the first surface, and is configured to secure the valve sealing device at a cutout in the valve;
a further sealing body arranged on a side of the retaining body which is opposite the sealing body, in particular in which the further sealing body is at least partially surrounded by a further metal sleeve.

2. The valve sealing device of claim 1, wherein at least one of the sealing body and the retaining body is at least partially surrounded by a metal sleeve.

3. The valve sealing device of claim 1, further comprising:
a further sealing body arranged on a side of the retaining body which is opposite the sealing body.

4. The valve sealing device of claim 3, wherein the sealing body and the further sealing body each have an essentially round base shape and are arranged offset with respect to one another, and wherein the sealing body and the further sealing body are connected via the retaining body located between them.

5. The valve sealing device of claim 1, wherein the retaining body is configured to secure the valve sealing device at the cutout in the valve, wherein the cutout is a cutout in a tilting armature of a tilting-armature valve, in which at least one of the sealing body and the retaining body is essentially cylindrical in shape.

6. The valve sealing device of claim 1, wherein at least one of the sealing body and the retaining body is at least partially surrounded by a metal sleeve, in particular a metal pot.

7. A valve sealing device for a tilting-armature valve, comprising:
a sealing body having a first surface to close in a fluid-tight manner one of a valve seat and an opening in a valve; and
a retaining body arranged on a surface of the sealing body which is opposite the first surface, and is configured to secure the valve sealing device at a cutout in the valve;
a further sealing body arranged on a side of the retaining body which is opposite the sealing body;
wherein the sealing body and the further sealing body each have an essentially round base shape and are arranged offset with respect to one another, and wherein the sealing body and the further sealing body are connected via the retaining body located between them, and wherein the sealing body and the further sealing body are each at least partially surrounded by a metal sleeve, which is a metal pot, and wherein at least one armature, which is connected to the metal sleeve that surrounds the sealing body, and at least one other armature, which is connected to a further metal sleeve that surrounds the further sealing body, is enclosed by the retaining body.

8. A method for manufacturing a valve sealing device for a tilting-armature valve, the method comprising:
forming a sealing body having a first surface configured to close in a fluid-tight manner one of a valve seat and an opening in a valve;
forming a retaining body arranged on a surface of the sealing body which is opposite the first surface, and which is configured to secure the valve sealing device at a cutout in a valve; and
performing at least one of the following:
making available a first sheet-metal panel and second sheet-metal panel;
deep drawing a first metal sleeve, in particular a first metal pot, in the first sheet-metal panel; and
deep drawing at least a second metal sleeve, in particular at least a second metal pot, in the second sheet-metal panel;
punching a first ring, interrupted by at least one retaining bridge, around the first metal sleeve and a second ring, interrupted by at least one retaining bridge, around the at least second metal sleeve, in each of the two sheet-metal panels;
aligning the first sheet-metal panel with the second sheet-metal panel, wherein the metal sleeves which are deep-drawn in the deep drawing step point toward one another; or
singularizing at least one of the first valve sealing device and the at least second valve sealing device by breaking the at least one retaining bridge.

9. The method of claim 8, wherein in the forming of at least one of the sealing body and the retaining body, at least one the sealing body or the retaining body are vulcanized.

10. The method of claim 8, wherein, in the forming, a first sealing body is formed within the first metal sleeve of the first sheet-metal panel and a further first sealing body is formed within the first metal sleeve of the second sheet-metal panel, and a first retaining body is formed between the first metal sleeve of the first sheet-metal panel and the first metal sleeve of the second sheet-metal panel, wherein the first retaining body connects the first sealing body to the further first sealing body, wherein the first sealing body, the first retaining body and the further first sealing body form a first valve sealing device, and wherein, in the forming, at least a second sealing body is formed within the at least second metal sleeve of the first sheet-metal panel and an at least further second sealing body is formed within the at least second metal sleeve of the second sheet-metal panel, and at least a second retaining body is formed between the at least second metal sleeve of the first sheet-metal panel and the at least further second metal sleeve of the second sheet-metal panel, wherein the at least second retaining body connects the at least second sealing body to the at least further second sealing body, wherein the at least second sealing body, the at least second retaining body and the at least further second sealing body form at least a second valve sealing device.

11. The method of claim 8, wherein the retaining body is configured to secure the valve sealing device at the cutout in the valve, wherein the cutout is a cutout in a tilting armature of a tilting-armature valve, in which at least one of the sealing body and the retaining body is essentially cylindrical in shape.

12. The method of claim 8, wherein, in the forming, a first sealing body is formed within the first metal sleeve of the first sheet-metal panel and a further first sealing body is formed within the first metal sleeve of the second sheet-metal panel, and a first retaining body is formed between the first metal sleeve of the first sheet-metal panel and the first metal sleeve of the second sheet-metal panel.

13. The method of claim 12, wherein the first retaining body connects the first sealing body to the further first sealing body, and wherein the first sealing body, the first retaining body and the further first sealing body form a first valve sealing device.

14. The method of claim 8, wherein, in the forming, at least a second sealing body is formed within the at least second metal sleeve of the first sheet-metal panel and an at least further second sealing body is formed within the at least second metal sleeve of the second sheet-metal panel, and at least a second retaining body is formed between the at least second metal sleeve of the first sheet-metal panel and the at least further second metal sleeve of the second sheet-metal panel.

15. The method of claim 14, wherein the at least second retaining body connects the at least second sealing body to the at least further second sealing body, wherein the at least second sealing body, the at least second retaining body and the at least further second sealing body form at least a second valve sealing device.

16. A tilting-armature valve for a pressure regulating module of a vehicle, comprising:
a valve sealing device, including:
a sealing body having a first surface to close in a fluid-tight manner one of a valve seat and an opening in a valve;
a retaining body arranged on a surface of the sealing body which is opposite the first surface, and is configured to secure the valve sealing device at a cutout in the valve, in particular in a cutout in a tilting armature of a tilting-armature valve, in particular in which at least one of the sealing body and the retaining body is essentially cylindrical in shape; and
a further sealing body arranged on a side of the retaining body which is opposite the sealing body, in particular in which the further sealing body is at least partially surrounded by a further metal sleeve;
at least one coil element;
a tilting armature;
a spring; and
a half-shell;
wherein the coil element includes at least one coil former and a coil which is arranged radially around the coil former,
wherein the tilting armature is mounted on an end side of the tilting armature by a bearing,
wherein the tilting armature is movable from a first position into a second position by activating the coil,
wherein the spring is configured to move the tilting armature,
wherein a first partial region of the spring is arranged on a side of the tilting armature facing the coil element and applies a force to the tilting armature to move the tilting armature in a direction of the first position, and a second partial region of the spring is arranged on a side of the tilting armature facing away from the coil element, wherein the valve sealing device is arranged on the side of the tilting armature facing away from the coil element, wherein a valve seat with an outlet and an inlet for a fluid is formed in the half-shell, and wherein in the first position of the tilting armature, the outlet can be closed off in a fluid-tight manner by the valve sealing device.

\* \* \* \* \*